United States Patent
Lin et al.

(10) Patent No.: US 10,939,424 B2
(45) Date of Patent: Mar. 2, 2021

(54) METHOD FOR TRANSMITTING DOWNLINK CONTROL INFORMATION, NETWORK SIDE DEVICE AND TERMINAL DEVICE

(71) Applicant: GUANGDONG OPPO MOBILE TELECOMMUNICATIONS CORP., LTD., Guangdong (CN)

(72) Inventors: Yanan Lin, Guangdong (CN); Hua Xu, Ottawa (CA)

(73) Assignees: GUANGDONG OPPO MOBILE, Guangdong (CN); TELECOMMUNICATIONS CORP., LTD., Guangdong (CN)

( * ) Notice: Subject to any disclaimer, the term of this patent is extended or adjusted under 35 U.S.C. 154(b) by 195 days.

(21) Appl. No.: 16/305,827

(22) PCT Filed: Sep. 30, 2016

(86) PCT No.: PCT/CN2016/101173
§ 371 (c)(1),
(2) Date: Nov. 29, 2018

(87) PCT Pub. No.: WO2018/058563
PCT Pub. Date: Apr. 5, 2018

(65) Prior Publication Data
US 2020/0322927 A1     Oct. 8, 2020

(51) Int. Cl.
*H04W 72/04*      (2009.01)
*H04B 7/06*       (2006.01)
(Continued)

(52) U.S. Cl.
CPC ........ *H04W 72/042* (2013.01); *H04B 7/0689* (2013.01); *H04L 1/0025* (2013.01); *H04L 5/0023* (2013.01); *H04L 5/0048* (2013.01)

(58) Field of Classification Search
CPC .. H04W 72/042; H04L 1/0025; H04L 5/0023; H04L 5/0048; H04B 7/0689
See application file for complete search history.

(56) References Cited

U.S. PATENT DOCUMENTS 9,497,750 B2    11/2016   Li et al.
2012/0087321 A1  4/2012   Han et al.
(Continued)

FOREIGN PATENT DOCUMENTS

CN    101631374 A    1/2010
CN    101730139 A    6/2010
(Continued)

OTHER PUBLICATIONS

Extended European Search Report for EP application No. 16917313.5 dated May 8, 2019.
(Continued)

*Primary Examiner* — Kabir A Timory
(74) *Attorney, Agent, or Firm* — Ladas & Parry LLP (57) ABSTRACT

Embodiments of the present disclosure provide a method for transmitting Downlink Control Information (DCI), a network side device and a terminal device. The method includes that: the network side device determines a transmission manner adopted to send downlink data to the terminal device; and the network side device sends DCI to the terminal device, the DCI carrying first indication information which indicates the transmission manner adopted by the network side device to send the downlink data to the terminal device.

17 Claims, 4 Drawing Sheets

(51) Int. Cl.
*H04L 1/00* (2006.01)
*H04L 5/00* (2006.01)

(56) References Cited

U.S. PATENT DOCUMENTS

| | | | |
|---|---|---|---|
| 2012/0195267 A1 | 8/2012 | Dai et al. | |
| 2014/0105162 A1* | 4/2014 | Li | H04W 72/042 |
| | | | 370/329 |
| 2014/0211710 A1 | 7/2014 | Guan et al. | |
| 2014/0314031 A1* | 10/2014 | Kim | H04L 5/001 |
| | | | 370/329 |
| 2015/0173052 A1 | 6/2015 | Zhang | |

FOREIGN PATENT DOCUMENTS

| | | |
|---|---|---|
| CN | 101808408 A | 8/2010 |
| CN | 102843209 A | 12/2012 |
| CN | 103024807 A | 4/2013 |
| CN | 103081389 A | 5/2013 |
| CN | 103650596 A | 3/2014 |
| CN | 103716132 A | 4/2014 |
| CN | 104009820 A | 8/2014 |
| CN | 104065453 A | 9/2014 |
| CN | 104852778 A | 8/2015 |
| CN | 105052227 A | 11/2015 |
| CN | 105578608 A | 5/2016 |

OTHER PUBLICATIONS

Notification to Go through Formalities of Registration for CN patent application No. 201680087381.9, dated Dec. 26, 2019.
International Search Report for corresponding application PCT/CN2016/101173 filed on Sep. 30, 2016; dated Mar. 24, 2017.
First Chinese Office Action for Application No. 201680087381.9, dated Aug. 15, 2019.
First office action in corresponding Taiwanese patent application No. 106129695, dated Feb. 15, 2020.
The Communication pursuant to Article 94(3) EPC of the corresponding EP patent application No. 16917313.5, dated Sep. 4, 2020.
The first examination report of the corresponding IN patent application No. 201817046223, dated Aug. 28, 2020.

* cited by examiner

Receive, by a terminal device, DCI sent by a network side device, the DCI carrying first indication information which indicates a transmission manner adopted by the network side device to send downlink data to the terminal device — 210

Determine, by the terminal device, a transmission manner adopted to receive the downlink data according to the first indication information — 220

METHOD FOR TRANSMITTING DOWNLINK CONTROL INFORMATION, NETWORK SIDE DEVICE AND TERMINAL DEVICE

RELATED APPLICATION

This application is an application under 35 U.S.C. 371 of International Application No. PCT/CN2016/101173 filed on Sep. 30, 2016, the entire contents of which are incorporated herein by reference.

TECHNICAL FIELD

The present disclosure relates to the field of mobile communication, and more particularly to a method and device for transmitting Downlink Control Information (DCI).

BACKGROUND

For adaptation to requirements of different application scenarios, different transmission modes are defined for Long Term Evolution (LTE) systems and different transmission manners are further defined in each transmission mode. In a certain transmission mode, a base station may adopt a main transmission manner which is supported in the transmission mode to send downlink data to a terminal device and, when a channel is unreliable or signal strength is relatively low, the base station may switch to another transmission manner to send the downlink data to the terminal device, that is, the base station may dynamically switch between different transmission manners in the transmission mode. Generally speaking, DCI corresponding to different transmission manners are different in length. Therefore, the terminal device may perform blind detection on DCI sent by the base station according to the lengths of the DCI corresponding to different transmission manners to further determine the transmission manner adopted by the base station.

In an LTE system, switching between different transmission modes requires interaction of high-layer signaling and a required switching time is relatively long. In addition, in each mode, a terminal device indirectly determines a transmission manner according to a length of detected DCI, and such a manner may not be so accurate and flexible.

SUMMARY

Embodiments of the present disclosure provides a method for transmitting DCI, a network side device and a terminal device, which may improve the flexibility and reliability of indicating a transmission manner of downlink data by the network side device.

A first exemplary embodiment provides a method for transmitting DCI, which may include that: a network side device determines a transmission manner adopted to send downlink data to a terminal device; and the network side device sends DCI to the terminal device, the DCI carrying first indication information which indicates the transmission manner adopted by the network side device to send the downlink data to the terminal device.

Compared with a manner of indirectly indicating a transmission manner of downlink data through a length of the DCI adopted in a related technology, the manner of directly indicating the transmission manner of the downlink data through the first indication information carried in the DCI is more flexible and higher in reliability.

In some implementations of the first exemplary embodiment, the transmission mode manner may include at least one of: open-loop space division multiplexing, closed-loop space division multiplexing, transmission diversity, open-loop Multiple Input Multiple Output (MIMO), closed-loop MIMO and quasi-open-loop MIMO.

The first indication information may indicate multiple transmission manners to facilitate the network side device and the terminal device to switch between different transmission modes manners.

In some implementations of the first exemplary embodiment, the DCI may include a first field, the first indication information may be a value of one or more bits in the first field, and different values of the one or more bits in the first field may indicate different transmission manners.

The first field may be a field dedicatedly adopted for indicating the transmission manner, so that different transmission manners may be indicated more directly and more accurately.

In some implementations of the first exemplary embodiment, the DCI may include a second field, the first indication information may be a value of one or more bits in the second field and different values of the one or more bits in the second field may indicate different transmission manners and part of control information in the DCI.

The transmission manner and part of control information in the DCI are indicated through the second field, so that the number of fields or bits occupied for indicating different transmission manners may be reduced.

In some implementations of the first exemplary embodiment, the DCI may include a feature code, the first indication information may be the feature code, different values of the feature code may indicate different transmission manners and the feature code may be carried in a field occupied by an error-detecting code of the DCI in a manner of scrambling the error-detecting code based on the feature code.

In some implementations of the first exemplary embodiment, the DCI may further carry at least one of: pilot signal configuration information, first associated information and second associated information. The first associated information may indicate whether a channel estimated by one pilot signal port is able to be deduced according to a channel estimated by another pilot signal port or not. The second associated information may indicate whether a channel estimated by a pilot signal port is able to be deduced according to a channel estimated by another signal or not. In some implementations, the other signal mentioned herein may be at least one of: a broadcast signal, a synchronization signal and a control signal sent to the terminal device by the network side device.

In some implementations of the first exemplary embodiment, the pilot signal configuration information may include at least one of: a number of pilot signal ports, a pilot signal position, a pilot signal density and a pilot signal scrambling information.

In some implementations of the first exemplary embodiment, the DCI may further carry second indication information which may indicate whether the terminal device receives the downlink data in a multi-user MIMO mode or not.

In some implementations of the first exemplary embodiment, the DCI sent to the terminal device by the network side device in different transmission manners may have a same length.

A second exemplary embodiment provides a method for transmitting DCI, which may include that: a terminal device receives DCI sent by a network side device, the DCI carrying first indication information which indicates a transmission manner adopted by the network side device to send downlink data to the terminal device; and the terminal device determines a transmission manner adopted to receive the downlink data according to the first indication information.

Compared with a manner of indirectly indicating a transmission manner of downlink data through a length of the DCI adopted in the related technology, the manner of directly indicating the transmission manner of the downlink data through the first indication information carried in the DCI is more flexible and higher in reliability.

In some implementations of the second exemplary embodiment, the transmission manner mode may include at least one of: open-loop space division multiplexing, closed-loop space division multiplexing, transmission diversity, open-loop MIMO, closed-loop MIMO and quasi-open-loop MIMO.

In some implementations of the second exemplary embodiment, the DCI may include a first field, the first indication information may be a value of one or more bits in the first field, and different values of the one or more bits in the first field may indicate different transmission manners.

In some implementations of the second exemplary embodiment, the DCI may include a second field, the first indication information may be a value of one or more bits in the second field and different values of the one or more bits in the second field may indicate different transmission manners and part of control information in the DCI.

In some implementations of the second exemplary embodiment, the DCI may include a feature code, the first indication information may be the feature code, different values of the feature code may indicate different transmission manners and the feature code may be carried in a field occupied by an error-detecting code of the DCI in a manner of scrambling the error-detecting code based on the feature code.

In some implementations of the second exemplary embodiment, the DCI may further carry at least one of: pilot signal configuration information, first associated information and second associated information. The first associated information may indicate whether a channel estimated by one pilot signal port is able to be deduced according to a channel estimated by another pilot signal port or not. The second associated information may indicate whether a channel estimated by a pilot signal port is able to be deduced according to a channel estimated by another signal or not. In some implementations, the other signal mentioned herein may be at least one of: a broadcast signal, a synchronization signal and a control signal sent to the terminal device by the network side device.

In some implementations of the second exemplary embodiment, the pilot signal configuration information may include at least one of: a number of pilot signal ports, a pilot signal position, a pilot signal density and a pilot signal scrambling information.

In some implementations of the second exemplary embodiment, the DCI may further carry second indication information which may indicate whether the terminal device receives the downlink data in a multi-user MIMO mode or not.

In some implementations, different values of the one or more bits in the second field indicate different transmission manners and pilot signal configuration information.

In some implementations, different values of the one or more bits in the second field indicate different transmission manners and different numbers of pilot signal, ports.

In some implementations, before the operation that the network side device sends the DCI to the terminal device, the method may further include that: the network side device sends third indication information to the terminal device. In the implementations, the third indication information is used for indicating a length of the DCI sent to the terminal device by the network side device.

A third exemplary embodiment provides a network side device, which includes modules configured to execute the method in the first exemplary embodiment.

A fourth exemplary embodiment provides a terminal device, which includes modules configured to execute the method in the second exemplary embodiment.

A fifth exemplary embodiment provides a network side device, which includes a memory, a processor and a transceiver. The memory is configured to store a program. The processor is configured to execute the program. When the program is executed, the processor and the transceiver are configured to execute the method in the first exemplary embodiment.

A sixth exemplary embodiment provides a terminal device, which includes a memory, a processor and a transceiver. The memory is configured to store a program. The processor is configured to execute the program. When the program is executed, the processor and the transceiver are configured to execute the method in the second exemplary embodiment.

A seventh exemplary embodiment provides a computer-readable medium, which stores a program code to be executed by a device, the program code including an instruction configured to execute the method in the first exemplary embodiment.

An eighth exemplary embodiment provides a computer-readable medium, which stores a program code to be executed by a device, the program code including an instruction configured to execute the method in the second exemplary embodiment.

DETAILED DESCRIPTION OF THE EMBODIMENTS

It is to be understood that the technical solutions of the embodiments of the present disclosure may be applied to various communication systems, for example, a a Global System of Mobile Communication (GSM), a Code Division Multiple Access (CDMA) system, a Wideband Code Division Multiple Access (WCDMA) system, a General Packet Radio Service (GPRS), an LTE system, a Universal Mobile Telecommunication System (UMTS) and the like, and may particularly be applied to a future 5th-Generation (5G) system.

In the embodiments of the present disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a 3o computing device, another processing device connected to a wireless modem, a vehicle-mounted device, a wearable device, a terminal device in a future 5G network, a terminal device in a future evolved Public Land Mobile Network (PLMN) or the like. There are no limits made in the embodiments of the present disclosure.

In the embodiments of the present disclosure, a network side device may be a device configured to communicate with the terminal device. The network side device may be a Base Transceiver Station (BTS) in the GSM or the CDMA, or a NodeB (NB) in the WCDMA system, or an Evolutional Node B (eNB or eNodeB) in the LTE system, or a wireless controller in a Cloud Radio Access Network (CRAN) scenario. Alternatively, the network device may be a relay station, an access point, a vehicle-mounted device, a wearable device or a network side device in the future 5G network, a network side device in the future evolved PLMN or the like. There are no limits made in the embodiments of the present disclosure.

Figure 1:
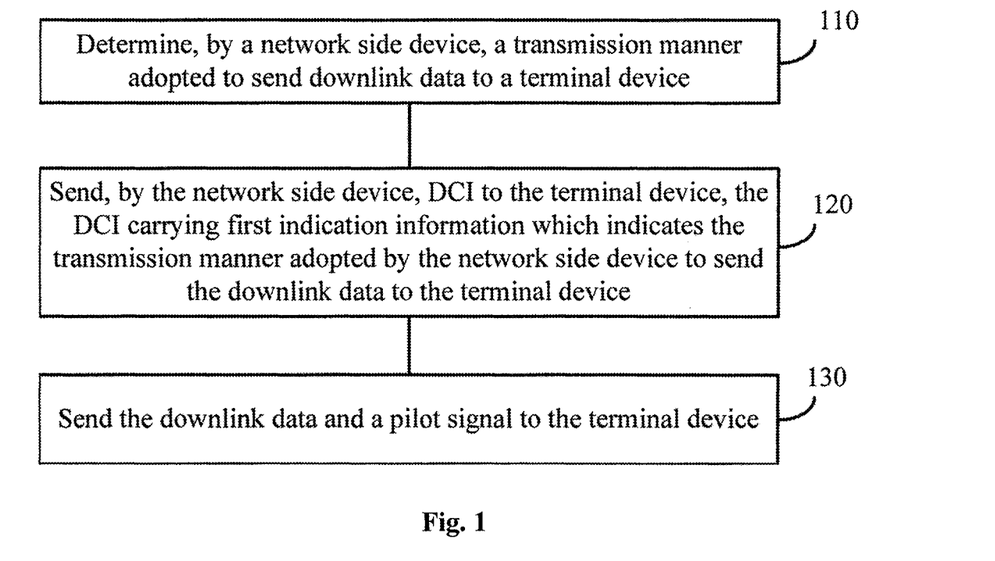
FIG. 1 is a schematic flowchart of a method for transmitting DCI according to an embodiment of the present disclosure.

FIG. 1 is a schematic flowchart of a method for transmitting DCI according to an embodiment of the present disclosure. The method shown in FIG. 1 includes the following operations in blocks 110 to 120.

In block 110, a network side device determines a transmission manner adopted to send downlink data to a terminal device.

The network side device may determine the transmission manner to be adopted according to strength of a signal of a cell where the terminal device is located and reliability of a channel between the network side device and the terminal device. For example, when the channel is relatively reliable and the signal is relatively strong, the network side device may determine that the transmission manner for transmitting the downlink data is open-loop space division multiplexing or closed-loop space division multiplexing. When the channel is not so reliable or the signal is relatively weak, the network side device may determine that the transmission manner for transmitting the downlink data is transmission diversity. That is, the network side device may flexibly determine the transmission manner for transmitting the downlink data according to the reliability of the channel, the strength of the signal or other information.

In at least one exemplary embodiment, the transmission manner may include at least one of: open-loop space division multiplexing, closed-loop space division multiplexing, transmission diversity, open-loop MIMO, closed-loop MIMO and quasi-open-loop MIMO.

In block 120, the network side device sends DCI to the terminal device, the DCI carrying first indication information which indicates the transmission manner adopted by the network side device to send the downlink data to the terminal device.

Compared with a manner of indirectly indicating a transmission manner of downlink data through a length of the DCI adopted in a related technology, the manner of directly indicating the transmission manner of the downlink data through the first indication information carried in the DCI in the embodiment of the present disclosure is more flexible and higher in reliability.

In at least one exemplary embodiment, the DCI includes a first field and a value of one or more bits in the first field is the first indication information. Different values of the one or more bits in the first field correspond to different transmission manners. The first field may be a field newly added in the DCI to represent the first indication information.

For example, when the first field occupies two bits, the first field has four different values and may represent at most four different transmission manners. As an example, a corresponding relationship between the values of the bits of the first field and the transmission manners may be as follows: 00 corresponds to transmission diversity, 01 corresponds to open-loop space division multiplexing, 10 corresponds to closed-loop space division multiplexing and 11 corresponds to reservation; alternatively, 00 corresponds to transmission diversity, 01 corresponds to open-loop MIMO, 10 corresponds to quasi-open-loop MIMO and 11 corresponds to closed-loop MIMO. When the first field occupies more than two bits, more transmission manners may be represented. There are no limits made to the number of bits occupied by the first field in the embodiments of the present disclosure. In addition, there are no specific limits made to correspondences between different values of the bits in the first field and the transmission manners.

The number of bits occupied by the first field may be determined according to the number of transmission manners supported by the network side device and the terminal device. For example, when three transmission manners are supported by the network side device and the terminal device, the number of bits occupied by the first field may be 2, and when five transmission manners are supported by the network side device and the terminal device, the number of bits occupied by the first field may be 3.

The bits (there may be one or more bits) in the first field are dedicatedly adopted to indicate the first indication information, so that indication reliability of the transmission manner may be improved.

In at least one exemplary embodiment, the DCI includes a second field, the first indication information is a value of one or more bits in the second field and different values of the one or more bits in the second field indicate different transmission manners and part of control information in the DCI.

It is to be understood that different values of the one or more bits in the second field may further represent other control information carried in the DCI. That is, when the second field is generated, the transmission manner and the other control information may be coded together. For example, the value of the bits of the second field may not only indicate the transmission manner but also indicate the number of pilot signal ports. If the second field occupies three bits, a corresponding relationship between the value of the bits of the second field and the number of the pilot signal ports and the transmission manner may be as follows: 001 represents that there are two pilot signal ports and the transmission manner is transmission diversity; 010 represents that there are two pilot signal ports and the transmission manner is open-loop space division multiplexing; and 100 represents that there are four pilot signal ports and the transmission manner is closed-loop space division multiplexing. Similarly, there are no limits made to the number of bits occupied by the second field and there are no specific limits made to correspondences between different values of the bits in the second field and the transmission manners in the embodiment of the present disclosure.

In at least one exemplary embodiment, the DCI includes a feature code, the first indication information is the feature code, different values of the feature code indicate different transmission manners, and the feature code is born in a field occupied by an error-detecting code of the DCI in a manner of scrambling the error-detecting code based on the feature code.

For example, assuming that there are four transmission manners in total and each transmission manner corresponds to one feature code. When the network side device determines to transmit the downlink data by adopting transmission diversity, the feature code corresponding to transmission diversity may be scrambled into the field occupied by the error-detecting code in the DCI to form a scrambled error-detecting code. After receiving the DCI, the terminal device may execute a series of operations sequentially according to the feature codes corresponding to the four transmission manners and the received scrambled error-detecting feature code to parse the error-detecting code in the DCI, and the terminal device can finally obtain the error-detecting code in the DCI by adopting the feature code corresponding to transmission diversity and successfully decode the control information in the DCI. In such case, the terminal device can determine that the transmission manner adopted by the network side device to transmit the downlink data is transmission diversity.

The number of bits of the feature code may be fewer than or equal to the number of bits of the error-detecting code in the DCI. For example, the feature code may occupy 12 bits and the error-detecting code in the DCI may occupy 16 bits, or the feature code and the error-detecting code both occupy 16 bits.

In at least one exemplary embodiment, the DCI sent to the terminal device by the network side device in different transmission manners has a same length. The network side device may equalize corresponding lengths of the DCI in different transmission manners (which may specifically be implemented in a manner of adding a number of zeros to the end of the DCI). By adopting this solution, unlike a related technology in which the terminal device performs blind detection on the DCI based on different DCI lengths on a resource where the DCI may be received respectively, the terminal device only needs to directly detect the DCI according to the same DCI length at a resource position where the DCI of the terminal device may be received. For example, if there are three possible transmission manners, and DCI lengths corresponding to the three transmission manners are 30 bit, 40 bit and 50 bit respectively, according to the related technology, the terminal device needs to detect the DCI based on the three DCI lengths on the resource where the DCI may be received, which makes it necessary to perform blind detection for many times. Therefore, compared with the related technology, the solution in this embodiment of the present disclosure has the advantage that the number of times of blind detection may be reduced.

It is to be understood that the length of the DCI may be preset or predetermined by the terminal device and the network side device; alternatively, the network side device, before sending the DCI to the terminal device, may send indication information to the terminal device to indicate the length of the DCI. In this way, the terminal device knows the length of the DCI when detecting the DCI.

In an LTE system of a related technology, it is inconvenient to flexibly switch transmission manners between the network side device and the terminal device, and the number of the pilot signal ports and a pilot signal transmission mode are also set on the basis of a cell. In a future system, for improving flexibility (for example, supporting rapid switching of the terminal device between beams and between cells), a pilot signal configuration is expected to be made on the basis of a terminal rather than a cell, which obviously cannot be met in the LTE system of the related technology. Therefore, some pilot signal related information is born in the DCI to enhance pilot signal transmission flexibility in the method for transmitting DCI in the embodiment of the present disclosure.

In at least one exemplary embodiment, the DCI may further carry at least one of: pilot signal configuration information, first associated information and second associated information. The first associated information indicates whether a channel estimated by one pilot signal port is able to be deduced according to a channel estimated by another pilot signal port or not. The second associated information indicates whether a channel estimated by a pilot signal port is able to be deduced according to a channel estimated by another signal or not. Herein, the other signal is at least one of a broadcast signal, a synchronization signal and a control signal sent to the terminal device by the network side device.

If there are two pilot signal ports, respectively being a first pilot signal port and a second pilot signal port, the first associated information may indicate whether a channel estimated by the second pilot signal port is able to be deduced according to a channel estimated by the first pilot signal port or not. As an exemplary implementation, the first associated information may occupy 1 bit, when the value of the bit is 0, it is indicated that the channel estimated by the second pilot signal port is not able to be deduced according to the channel estimated by the first pilot signal port; and when the value of the bit is 1, it is indicated that the channel estimated by the second pilot signal port is able to be deduced according to the channel estimated by the first pilot signal port. Then, the terminal device may determine whether to deduce the channel estimated by the second pilot signal port according to the channel estimated by the first pilot signal port or not according to the first associated information.

Similarly, the network side device may also determine whether the channel estimated by the pilot signal port is able to be deduced according to the channel estimated by the other signal or not and transmit the corresponding channel to the terminal device through the second associated information. For example, the network side device determines that the channel estimated by the first pilot signal port is able to be deduced according to a channel estimated by the synchronization signal, then generates the second associated information and sends the second associated information to the terminal device. The terminal device, after receiving the second associated information, may deduce the channel estimated by the first pilot signal port according to the channel estimated by the synchronization signal. Herein, the other signal may alternatively be a signal except the broadcast signal, the synchronization signal and the control signal sent to the terminal device by the network side device.

The pilot signal port may be understood as a pilot signal transmission port. In at least one exemplary embodiment, the network side device may determine the first associated information according to a relationship between pilot signal ports. As an exemplary implementation, the network side device may determine the first associated information according to a position relationship or polarization direction relationship between the pilot signal ports. For example, the network side device sends a pilot signal to the terminal device through the first pilot signal port and the second pilot signal port. If a distance between the first pilot signal port and the second pilot signal port is relatively short or polarization directions are relatively similar, the network side device may determine that the first associated information indicates that the channel estimated by the second pilot signal port is able to be deduced according to the channel estimated by the first pilot signal port. If the distance between the first pilot signal port and the second pilot signal port is relatively long or the polarization directions are very different, the network side device may determine that the first associated information indicates that the channel estimated by the second pilot signal port is not able to be deduced according to the channel estimated by the first pilot signal port.

It is to be understood that, in some embodiments of the present disclosure, there may be multiple pilot signal ports transmitting pilot signals and part of pilot signal ports in these pilot signal ports may correspond to the same Transmit and Receive Point (TRP). The pilot signal ports may alternatively correspond to different TRPs. When the pilot signal ports correspond to the same TRP, the pilot signal ports may correspond to the same beam or different beams under the same TRP.

The pilot signal configuration information may include at least one of: a number of pilot signal ports, a pilot signal position, a pilot signal density and pilot signal scrambling information.

The pilot signal configuration information may be represented by adopting a field, which is dedicated to indicating the pilot signal configuration information, in the DCI. For example, if demodulation reference signals of at most eight ports are expected to be supported, at most three bits may be adopted to represent the number of the pilot signal ports. In addition, when the pilot signal position and density are represented, a few bits (for example, two bits) may be adopted to represent different pilot signal transmission positions and different pilot signal densities.

When there is much pilot signal configuration information, the network side device may send a pilot configuration pool to the terminal device in advance through high-layer signaling. Then, the network side device adopts a number of bits to indicate a pilot configuration in the DCI according to a practical condition. The information indicating the pilot configuration may be independently coded, or may be jointly coded, or may be coded together with other control information. In addition, the pilot signal position may refer to a position of a time-frequency resource on which the pilot signal is sent.

In at least one exemplary embodiment, the DCI further carries second indication information which indicates whether the terminal device receives the downlink data in a multi-user MIMO mode or not.

Figure 2:
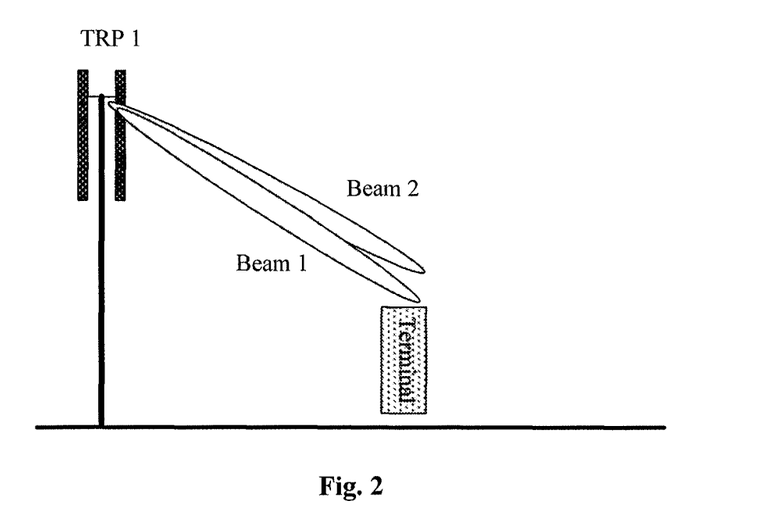
FIG. 2 is a schematic diagram of MIMO with two transmission antennae.
Figure 3:
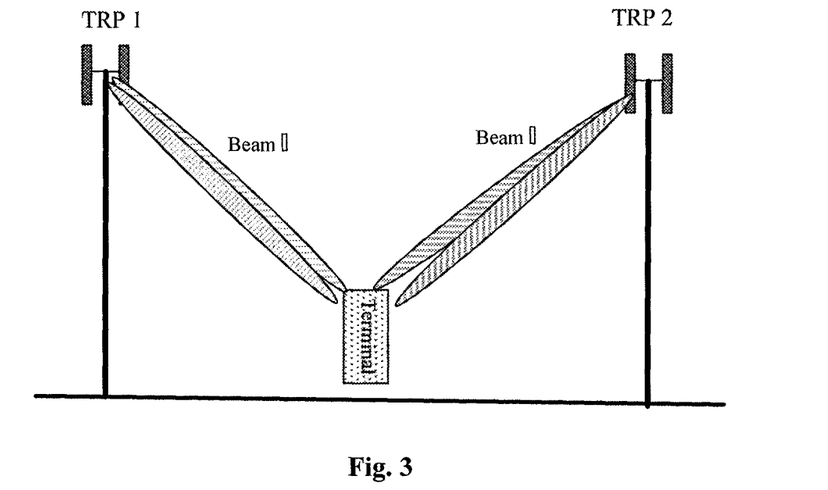
FIG. 3 is a schematic diagram of MIMO with four transmission antennae.

As shown in FIG. 2 and FIG. 3, when the terminal device is at different positions in a cell, the network side device may configure different MIMO transmission manners for the terminal device. In FIG. 2, when the terminal device is under coverage of a certain beam in the cell, the network side device may configure MIMO with two transmission antennae for the terminal device. As shown in FIG. 3, when the terminal device moves to an edge of the cell and enters coverage of an adjacent cell, the network side device may configure MIMO with four transmission antennae for the terminal device, two antennae are from the cell, the other two antennae are from the adjacent cell and all of the four antennae may provide space division multiplexing or transmission diversity manner-based data transmission for the terminal device. When a signal of one cell is relatively weak, the network side device may configure MIMO with two transmission antennae for the terminal device, that is, the MIMO transmission manner may be switched from MIMO with four transmission antennae to MIMO with two transmission antennae.

The method for transmitting DCI of the embodiments of the present disclosure is described above from the perspective of the network side device in combination with FIG. 1 to FIG. 3 in detail. The method for transmitting DCI of the embodiments of the present disclosure will be described below from the perspective of the terminal device in combination with FIG. 4. It is to be understood that a process of the method for transmitting DCI shown in FIG. 4 corresponds to the process of the method for transmitting DCI of the embodiments of the present disclosure in FIG. 1. Explanations and definitions made above to the method for transmitting DCI of the embodiments of the present disclosure are also applicable to the method for transmitting DCI shown in FIG. 4. For simplicity, repeated descriptions are eliminated herein.

Figure 4:
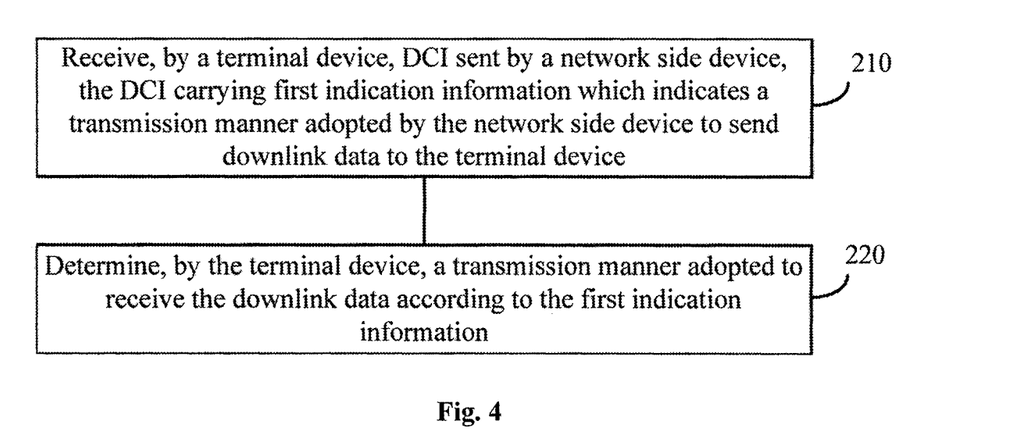
FIG. 4 is a schematic flowchart of a method for transmitting DCI according to an embodiment of the present disclosure.

FIG. 4 is a schematic flowchart of a method for transmitting DCI according to an embodiment of the present disclosure. The method shown in FIG. 4 includes the following operations in blocks 210 to 220.

In block 210, a terminal device receives DCI sent by a network side device, the DCI carrying first indication information which indicates a transmission manner adopted by the network side device to send downlink data to the terminal device.

In block 220, the terminal device determines a transmission manner adopted to receive the downlink data according to the first indication information.

Compared with a manner of indirectly indicating a transmission manner of downlink data through a length of the DCI adopted in the related technology, the manner of directly indicating the transmission manner of the downlink data through the first indication information carried in the DCI in the embodiment of the present disclosure is more flexible and higher in reliability.

In at least one exemplary embodiment, the transmission mode manner includes at least one of: open-loop space division multiplexing, closed-loop space division multiplexing, transmission diversity, open-loop MIMO, closed-loop MIMO and quasi-open-loop MIMO.

The first indication information may indicate multiple transmission manners to facilitate the network side device and the terminal device to switch between different transmission manners.

In at least one exemplary embodiment, the DCI includes a first field, the first indication information is a value of one or more bits in the first field, and different values of the one or more bits in the first field indicate different transmission manners.

The first field may be a field dedicatedly adopted for indicating the transmission manner, so that different transmission manners may be indicated more directly and more accurately.

In at least one exemplary embodiment, the DCI includes a second field, the first indication information is a value of one or more bits in the second field and different values of the one or more bits in the second field indicate different transmission manners and part of control information in the DCI.

The transmission manner and part of control information in the DCI are indicated through the second field, so that the number of fields or bits occupied for indicating different transmission manners may be reduced.

In at least one exemplary embodiment, the DCI includes a feature code, the first indication information is the feature code, different values of the feature code indicate different transmission manners, and the feature code is born in a field occupied by an error-detecting code of the DCI in a manner of scrambling the error-detecting code based on the feature code.

In at least one exemplary embodiment, the DCI further carries at least one of: pilot signal configuration information, first associated information and second associated information. The first associated information indicates whether a channel estimated by one pilot signal port is able to be deduced according to a channel estimated by another pilot signal port or not. The second associated information indicates whether a channel estimated by a pilot signal port is able to be deduced according to a channel estimated by another signal or not, the other signal being at least one of: a broadcast signal, a synchronization signal and a control signal sent to the terminal device by the network side device.

In at least one exemplary embodiment, the pilot signal configuration information includes at least one of: a number of pilot signal ports, a pilot signal position, a pilot signal density and a pilot signal scrambling information.

In at least one exemplary embodiment, the DCI further carries second indication information which indicates whether the terminal device receives the downlink data in a multi-user MIMO mode or not.

The method for transmitting DCI of the embodiments of the present disclosure is described above in combination with FIG. 1 to FIG. 4 in detail. A network side device and terminal device of the embodiments of the present disclosure will be described below in combination with FIG. 5 to FIG. 8 in detail. It is to be understood that the network side device and terminal device in FIG. 5 to FIG. 8 may execute each operation executed by the network side device and terminal device above and, for avoiding repetitions, will not be elaborated herein.

Figure 5:
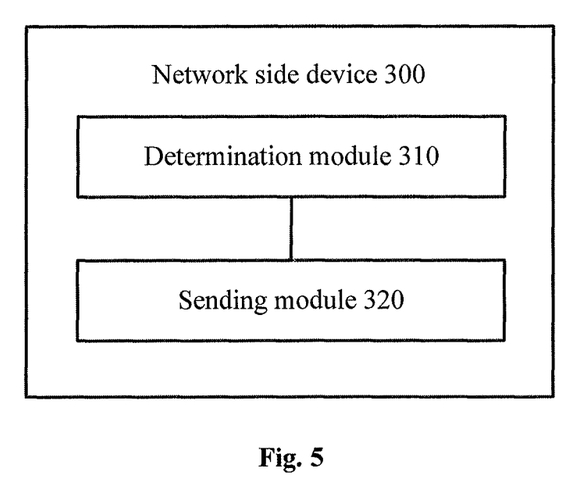
FIG. 5 is a schematic block diagram of a network side device according to an embodiment of the present disclosure.

FIG. 5 is a schematic block diagram of a network side device according to an embodiment of the present disclosure. The network side device 300 shown in FIG. 5 includes:

a determination module 310, configured to determine a transmission manner adopted to send downlink data to a terminal device; and a sending module 320, configured to send DCI to the terminal device, the DCI carrying first indication information which indicates the transmission manner adopted by the network side device to send the downlink data to the terminal device.

Compared with a manner of indirectly indicating a transmission manner of downlink data through a length of the DCI adopted in a related technology, the manner of directly indicating the transmission manner of the downlink data through the first indication information carried in the DCI in the embodiment of the present disclosure is more flexible and higher in reliability.

In at least one exemplary embodiment, the transmission manner includes at least one of: open-loop space division multiplexing, closed-loop space division multiplexing, transmission diversity, open-loop MIMO, closed-loop MIMO and quasi-open-loop MIMO.

In at least one exemplary embodiment, the DCI includes a first field, the first indication information is a value of one or more bits in the first field, and different values of the one or more bits in the first field indicate different transmission manners.

In at least one exemplary embodiment, the DCI includes a second field, the first indication information is a value of one or more bits in the second field and different values of the one or more bits in the second field indicate different transmission manners and part of control information in the DCI.

In at least one exemplary embodiment, the DCI includes a feature code, the first indication information is the feature code, different values of the feature code indicate different transmission manners, and the feature code is born in a field occupied by an error-detecting code of the DCI in a manner of scrambling the error-detecting code based on the feature code.

In at least one exemplary embodiment, the DCI further carries at least one of: pilot signal configuration information, first associated information and second associated information. The first associated information indicates whether a channel estimated by one pilot signal port is able to be deduced according to a channel estimated by another pilot signal port or not. The second associated information indicates whether a channel estimated by a pilot signal port is able to be deduced according to a channel estimated by another signal or not, the other signal being at least one of: a broadcast signal, a synchronization signal and a control signal sent to the terminal device by the network side device.

In at least one exemplary embodiment, the pilot signal configuration information includes at least one of: a number of pilot signal ports, a pilot signal position, a pilot signal density and a pilot signal scrambling information.

In at least one exemplary embodiment, the DCI further carries second indication information which indicates whether the terminal device receives the downlink data in a multi-user MIMO mode or not.

In at least one exemplary embodiment, the DCI sent to the terminal device by the network side device in different transmission manners has a same length.

Figure 6:
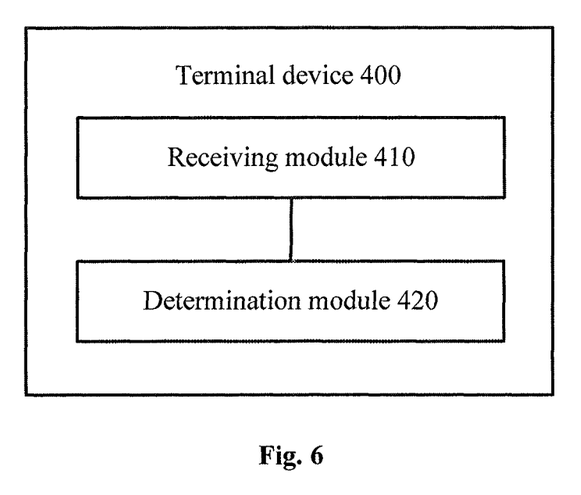
FIG. 6 is a schematic block diagram of a terminal device according to an embodiment of the present disclosure.

FIG. 6 is a schematic block diagram of a terminal device according to an embodiment of the present disclosure. The terminal device 400 shown in FIG. 6 includes:

a receiving module 410, configured to receive DCI sent by a network side device, the DCI carrying first indication information which indicates a transmission manner adopted by the network side device to send downlink data to the terminal device; and a determination module 420, configured to determine a transmission manner adopted to receive the downlink data according to the first indication information.

Compared with a manner of indirectly indicating a transmission manner of downlink data through a length of the DCI adopted in the related technology, the manner of directly indicating the transmission manner of the downlink data through the first indication information carried in the DCI in the embodiment of the present disclosure is more flexible and higher in reliability.

In at least one exemplary embodiment, the transmission manner includes at least one of: open-loop space division multiplexing, closed-loop space division multiplexing, transmission diversity, open-loop MIMO, closed-loop MIMO and quasi-open-loop MIMO.

In at least one exemplary embodiment, the DCI includes a first field, the first indication information is a value of one or more bits in the first field, and different values of the one or more bits in the first field indicate different transmission manners.

In at least one exemplary embodiment, the DCI includes a second field, the first indication information is a value of one or more bits in the second field and different values of the one or more bits in the second field indicate different transmission manners and part of control information in the DCI.

In at least one exemplary embodiment, the DCI includes a feature code, the first indication information is the feature code, different values of the feature code indicate different transmission manners, and the feature code is born in a field occupied by an error-detecting code of the DCI in a manner of scrambling the error-detecting code based on the feature code.

In at least one exemplary embodiment, the DCI further carries at least one of: pilot signal configuration information, first associated information and second associated information. The first associated information indicates whether a channel estimated by one pilot signal port is able to be deduced according to a channel estimated by another pilot signal port or not. The second associated information indicates whether a channel estimated by a pilot signal port is able to be deduced according to a channel estimated by another signal or not, the other signal being at least one of: a broadcast signal, a synchronization signal and a control signal sent to the terminal device by the network side device.

In at least one exemplary embodiment, the pilot signal configuration information includes at least one of: a number of pilot signal ports, a pilot signal position, a pilot signal density and a pilot signal scrambling information.

In at least one exemplary embodiment, the DCI further carries second indication information which indicates whether the terminal device receives the downlink data in a multi-user MIMO mode or not.

Figure 7:
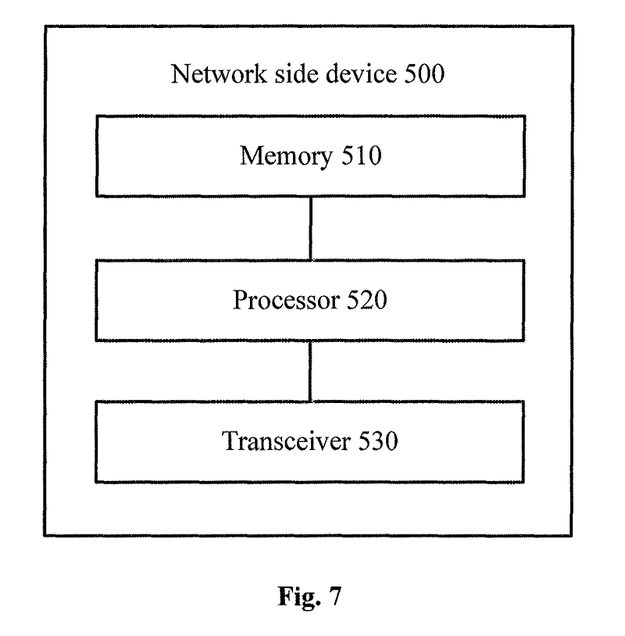
FIG. 7 is a schematic block diagram of a network side device according to an embodiment of the present disclosure.

FIG. 7 is a schematic block diagram of a network side device according to an embodiment of the present disclosure. The network side device 500 shown in FIG. 7 includes:
a memory 510, configured to store a program;
a processor 520, configured to execute the program stored in the memory 510, the program, when being executed, enables the processor 520 to determine a transmission manner adopted to send downlink data to a terminal device; and
a transceiver 530, configured to send DCI to the terminal device, the DCI carrying first indication information which indicates the transmission manner adopted by the network side device to send the downlink data to the terminal device.

Compared with a manner of indirectly indicating a transmission manner of downlink data through a length of the DCI adopted in a related technology, the manner of directly indicating the transmission manner of the downlink data through the first indication information carried in the DCI in the embodiment of the present disclosure is more flexible and higher in reliability.

In at least one exemplary embodiment, the transmission manner includes at least one of: open-loop space division multiplexing, closed-loop space division multiplexing, transmission diversity, open-loop MIMO, closed-loop MIMO and quasi-open-loop MIMO.

In at least one exemplary embodiment, the DCI includes a first field, the first indication information is a value of one or more bits in the first field, and different values of the one or more bits in the first field indicate different transmission manners.

In at least one exemplary embodiment, the DCI includes a second field, the first indication information is a value of one or more bits in the second field and different values of the one or more bits in the second field indicate different transmission manners and part of control information in the DCI.

In at least one exemplary embodiment, the DCI includes a feature code, the first indication information is the feature code, different values of the feature code indicate different transmission manners, and the feature code is born in a field occupied by an error-detecting code of the DCI in a manner of scrambling the error-detecting code based on the feature code.

In at least one exemplary embodiment, the DCI further carries at least one of: pilot signal configuration information, first associated information and second associated information. The first associated information indicates whether a channel estimated by one pilot signal port is able to be deduced according to a channel estimated by another pilot signal port or not. The second associated information indicates whether a channel estimated by a pilot signal port is able to be deduced according to a channel estimated by another signal or not, the other signal being at least one of: a broadcast signal, a synchronization signal and a control signal sent to the terminal device by the network side device.

In at least one exemplary embodiment, the pilot signal configuration information includes at least one of: a number of pilot signal ports, a pilot signal position, a pilot signal density and a pilot signal scrambling information.

In at least one exemplary embodiment, the DCI further carries second indication information which indicates whether the terminal device receives the downlink data in a multi-user MIMO mode or not.

In at least one exemplary embodiment, the DCI sent to the terminal device by the network side device in different transmission manners has a same length.

Figure 8:
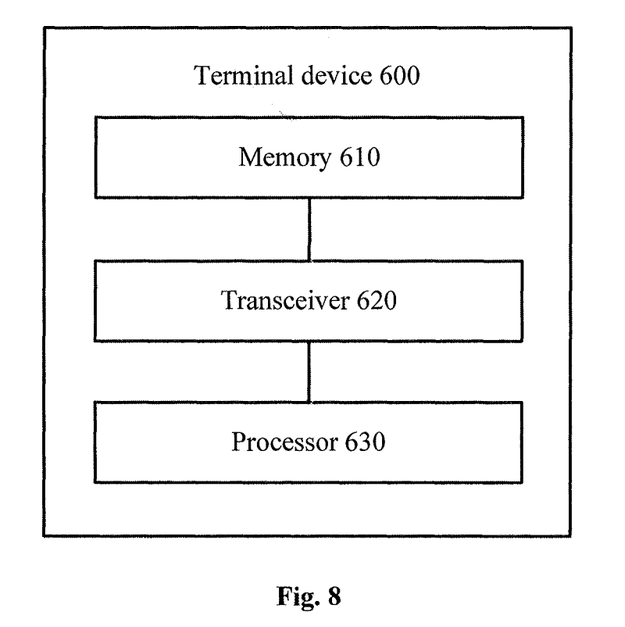
FIG. 8 is a schematic block diagram of a terminal device according to an embodiment of the present disclosure.

FIG. 8 is a schematic block diagram of a terminal device according to an embodiment of the present disclosure. The terminal device 600 shown in FIG. 8 includes:
a memory 610, configured to store a program;
a transceiver 620, configured to receive DCI sent by a network side device, the DCI carrying first indication information which indicates a transmission manner adopted by the network side device to send downlink data to the terminal device; and
a processor 630, configured to execute the program stored in the memory 610, the program, when being executed, enables the processor 620 to determine a transmission manner adopted to receive the downlink data according to the first indication information.

Compared with a manner of indirectly indicating a transmission manner of downlink data through a length of the DCI adopted in the related technology, the manner of directly indicating the transmission manner of the downlink data through the first indication information carried in the DCI in the embodiment of the present disclosure is more flexible and higher in reliability.

In at least one exemplary embodiment, the transmission manner includes at least one of: open-loop space division multiplexing, closed-loop space division multiplexing, transmission diversity, open-loop MIMO, closed-loop MIMO and quasi-open-loop MIMO.

In at least one exemplary embodiment, the DCI includes a first field, the first indication information is a value of one or more bits in the first field, and different values of the one or more bits in the first field indicate different transmission manners.

In at least one exemplary embodiment, the DCI includes a second field, the first indication information is a value of one or more bits in the second field and different values of the one or more bits in the second field indicate different transmission manners and part of control information in the DCI.

In at least one exemplary embodiment, the DCI includes a feature code, the first indication information is the feature code, different values of the feature code indicate different transmission manners, and the feature code is born in a field occupied by an error-detecting code of the DCI in a manner of scrambling the error-detecting code based on the feature code.

In at least one exemplary embodiment, the DCI further carries at least one of: pilot signal configuration information, first associated information and second associated information. The first associated information indicates whether a channel estimated by one pilot signal port is able to be deduced according to a channel estimated by another pilot signal port or not. The second associated information indicates whether a channel estimated by a pilot signal port is able to be deduced according to a channel estimated by another signal or not, the other signal being at least one of: a broadcast signal, a synchronization signal and a control signal sent to the terminal device by the network side device.

In at least one exemplary embodiment, the pilot signal configuration information includes at least one of: a number of pilot signal ports, a pilot signal position, a pilot signal density and a pilot signal scrambling information.

In at least one exemplary embodiment, the DCI further carries second indication information which indicates whether the terminal device receives the downlink data in a multi-user MIMO mode or not.

Those of ordinary skill in the art may realize that the units and algorithm operations of each example described in combination with the embodiments provided in the present disclosure may be implemented by electronic hardware or a combination of computer software and the electronic hardware. Whether these functions are executed in a hardware or software manner depends on specific applications and design constraints of the technical solutions. Those skilled in the art may realize the described functions for each application by adopting different methods, but such realization shall fall within the scope of the present disclosure.

Those skilled in the art may clearly learn about that the working processes of the systems, devices and units described above may refer to the corresponding processes in the method embodiments and will not be elaborated herein for convenient and brief description.

In some embodiments provided by the present disclosure, it is to be understood that the disclosed systems, devices and methods may be implemented in another manner. For example, the device embodiment described above is only schematic, and for example, division of the units is only based on logic functions, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection of the device or the units implemented through some interfaces, and may be electrical, mechanical or in other forms.

The units described as separate parts may or may not be physically separated. Parts displayed as units may or may not be physical units, and may be located in the same place or may alternatively be distributed to multiple network units. Part or all of the units may be selected to achieve the purpose of the solutions of the embodiments according to a practical requirement.

In addition, each function unit in each embodiment of the present disclosure may be integrated into a processing unit or may exist independently, and alternatively, two or more than two units may be integrated into one unit.

When being realized in the form of software functional unit and sold or used as an independent product, the function may be stored in a computer-readable storage medium. Based on such an understanding, a part of the technical solutions or the part of the technical solutions of the embodiments of the present disclosure substantially making contributions to the related technology may be embodied in a form of software product. The software product may be stored in a storage medium, including a plurality of instructions configured to enable a computer device (which may be a personal computer, a server, a network device or the like) to execute all or part of the operations of the method in each embodiment of the present disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the exemplary implementations of the present disclosure and is not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

What is claimed is:

1. A method for transmitting Downlink Control Information (DCI), comprising:
   determining, by a network side device, a transmission manner adopted to send downlink data to a terminal device; and
   sending, by the network side device, DCI to the terminal device, the DCI carrying first indication information which indicates the transmission manner adopted by the network side device to send the downlink data to the terminal device;
   wherein the DCI further carries at least one of: pilot signal configuration information, first associated information and second associated information, wherein the first associated information indicates whether a channel estimated by one pilot signal port is able to be deduced according to a channel estimated by another pilot signal port or not, and the second associated information indicates whether a channel estimated by a pilot signal port is able to be deduced according to a channel estimated by another signal or not, the other signal being at least one of: a broadcast signal, a synchronization signal and a control signal sent to the terminal device by the network side device.

2. The method as claimed in claim 1, wherein the transmission manner comprises at least one of: open-loop space division multiplexing, closed-loop space division multiplexing, transmission diversity, open-loop Multiple Input Multiple Output (MIMO), closed-loop MIMO and quasi-open-loop MIMO.

3. The method as claimed in claim 1, wherein the DCI comprises a first field, the first indication information is a value of one or more bits in the first field, and different values of the one or more bits in the first field indicate different transmission manners;

or, the DCI comprises a second field, the first indication information is a value of one or more bits in the second field and different values of the one or more bits in the second field indicate different transmission manners and part of control information in the DCI;

or, the DCI comprises a feature code, the first indication information is the feature code, different values of the feature code indicate different transmission manners, and the feature code is born in a field occupied by an error-detecting code of the DCI in a manner of scrambling the error-detecting code based on the feature code.

4. The method as claimed in claim 1, wherein the pilot signal configuration information comprises at least one of: a number of pilot signal ports, a pilot signal position, a pilot signal density and a pilot signal scrambling information.

5. The method as claimed in claim 1, wherein the DCI further carries second indication information which indicates whether the terminal device receives the downlink data in a multi-user MIMO mode or not.

6. The method as claimed in claim 1, wherein the DCI sent to the terminal device by the network side device in different transmission manners has a same length.

7. A method for transmitting Downlink Control Information (DCI), comprising:

receiving, by a terminal device, DCI sent by a network side device, the DCI carrying first indication information which indicates a transmission manner adopted by the network side device to send downlink data to the terminal device; and determining, by the terminal device, a transmission manner adopted to receive the downlink data according to the first indication information;

wherein the DCI further carries at least one of: pilot signal configuration information, first associated information and second associated information, the first associated information indicates whether a channel estimated by one pilot signal port is able to be deduced according to a channel estimated by another pilot signal port or not, and the second associated information indicates whether a channel estimated by a pilot signal port is able to be deduced according to a channel estimated by another signal or not, the other signal being at least one of: a broadcast signal, a synchronization signal and a control signal sent to the terminal device by the network side device.

8. The method as claimed in claim 7, wherein the transmission manner comprises at least one of: open-loop space division multiplexing, closed-loop space division multiplexing, transmission diversity, open-loop Multiple Input Multiple Output (MIMO), closed-loop MIMO and quasi-open-loop MIMO.

9. The method as claimed in claim 7, wherein the DCI comprises a first field, the first indication information is a value of one or more bits in the first field, and different values of the one or more bits in the first field indicate different transmission manners.

10. The method as claimed in claim 7, wherein the DCI comprises a second field, the first indication information is a value of one or more bits in the second field and different values of the one or more bits in the second field indicate different transmission manners and part of control information in the DCI.

11. The method as claimed in claim 7, wherein the DCI comprises a feature code, the first indication information is the feature code, different values of the feature code indicate different transmission manners, and the feature code is born in a field occupied by an error-detecting code of the DCI in a manner of scrambling the error-detecting code based on the feature code.

12. The method as claimed in claim 7, wherein the pilot signal configuration information comprises at least one of: a number of pilot signal ports, a pilot signal position, a pilot signal density and a pilot signal scrambling information.

13. The method as claimed in claim 7, wherein the DCI further carries second indication information which indicates whether the terminal device receives the downlink data in a multi-user MIMO mode or not.

14. A terminal device, comprising:

at least one processor; and a computer readable storage, coupled to the at least one processor and storing at least one computer executable instructions which, when being executed by the at least one processor, cause the at least one processor to carry out following actions:

receiving Downlink Control Information (DCI) sent by a network side device, the DCI carrying first indication information which indicates a transmission manner adopted by the network side device to send downlink data to the terminal device; and determining a transmission manner adopted to receive the downlink data according to the first indication information;

wherein the DCI further carries at least one of: pilot signal configuration information, first associated information and second associated information, the first associated information indicates whether a channel estimated by one pilot signal port is able to be deduced according to a channel estimated by another pilot signal port or not, and the second associated information indicates whether a channel estimated by a pilot signal port is able to be deduced according to a channel estimated by another signal or not, the other signal being at least one of: a broadcast signal, a synchronization signal and a control signal sent to the terminal device by the network side device.

15. The terminal device as claimed in claim 14, wherein the transmission mode comprises at least one of: open-loop space division multiplexing, closed-loop space division multiplexing, transmission diversity, open-loop Multiple Input Multiple Output (MIMO), closed-loop MIMO and quasi-open-loop MIMO.

16. The terminal device as claimed in claim 14, wherein the DCI comprises a first field, the first indication information is a value of one or more bits in the first field, and different values of the one or more bits in the first field indicate different transmission manners;

or, the DCI comprises a second field, the first indication information is a value of one or more bits in the second field and different values of the one or more bits in the second field indicate different transmission manners and part of control information in the DCI;

or, the DCI comprises a feature code, the first indication information is the feature code, different values of the feature code indicate different transmission manners, and the feature code is born in a field occupied by an error-detecting code of the DCI in a manner of scrambling the error-detecting code based on the feature code.

17. The terminal device as claimed in claim 14, wherein the DCI further carries second indication information which indicates whether the terminal device receives the downlink data in a multi-user MIMO mode or not.

* * * * *

UNITED STATES PATENT AND TRADEMARK OFFICE
CERTIFICATE OF CORRECTION

Page 1 of 1

PATENT NO. : 10,939,424 B2
APPLICATION NO. : 16/305827
DATED : March 2, 2021
INVENTOR(S) : Yanan Lin et al.

It is certified that error appears in the above-identified patent and that said Letters Patent is hereby corrected as shown below:

On the Title Page (71) Applicant:
"GUANGDONG OPPO MOBILE TELECOMMUNICATIONS CORP., LTD., Guangdong (CN)"
Should read as:
--GUANGDONG OPPO MOBILE TELECOMMUNICATIONS CORP., LTD., Dongguan, Guangdong (CN)--

(73) Assignee:
"GUANGDONG OPPO MOBILE TELECOMMUNICATIONS CORP., LTD., Guangdong (CN)"
Should read as:
--GUANGDONG OPPO MOBILE TELECOMMUNICATIONS CORP., LTD., Dongguan, Guangdong (CN)--

Signed and Sealed this
Eleventh Day of May, 2021

Drew Hirshfeld
*Performing the Functions and Duties of the
Under Secretary of Commerce for Intellectual Property and
Director of the United States Patent and Trademark Office*